Aug. 9, 1938.    J. FREI, JR    2,125,907
ARTIFICIAL CHRISTMAS TREE AND METHOD OF PRODUCING SAME
Filed April 8, 1936    2 Sheets-Sheet 1
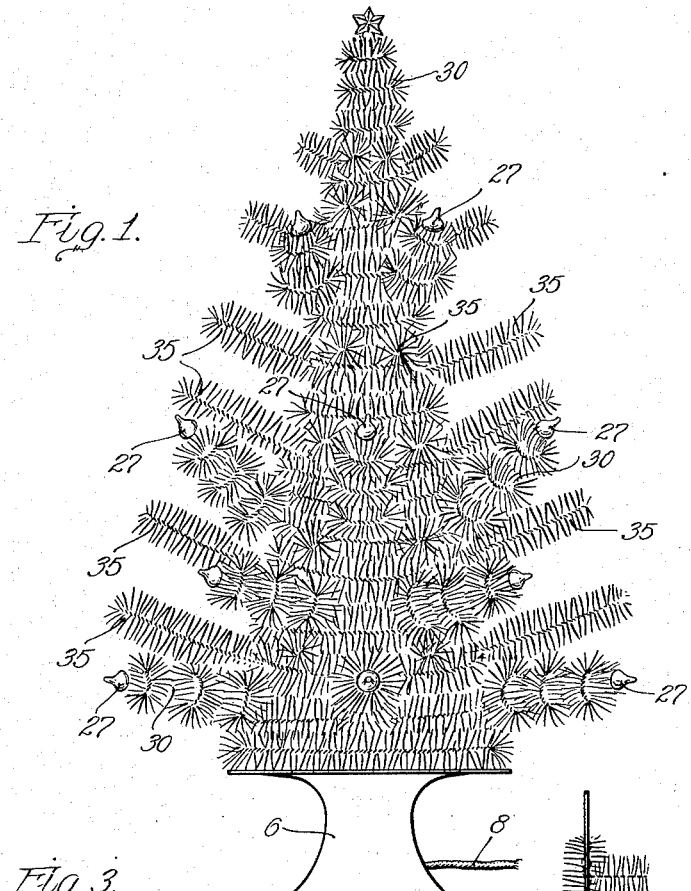
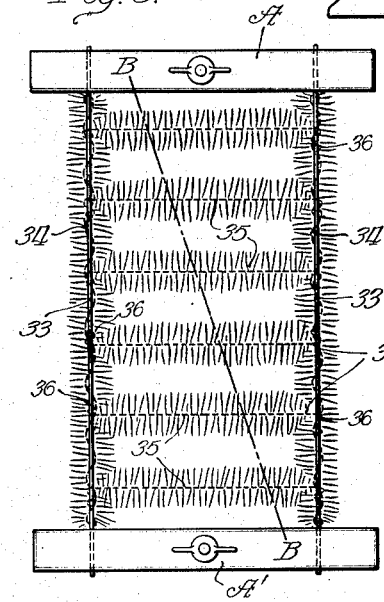
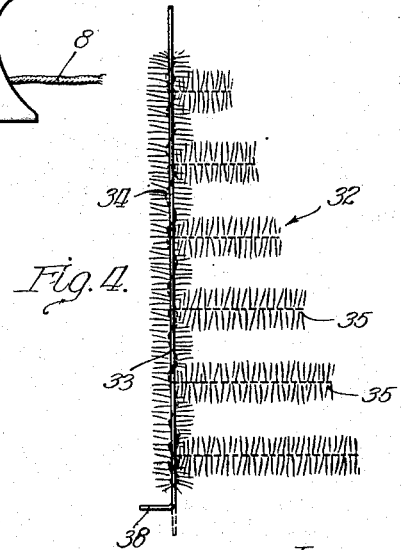
Inventor:
John Frei, Jr.
By: Brown, Jackson, Boettcher & Dienner
Attys.

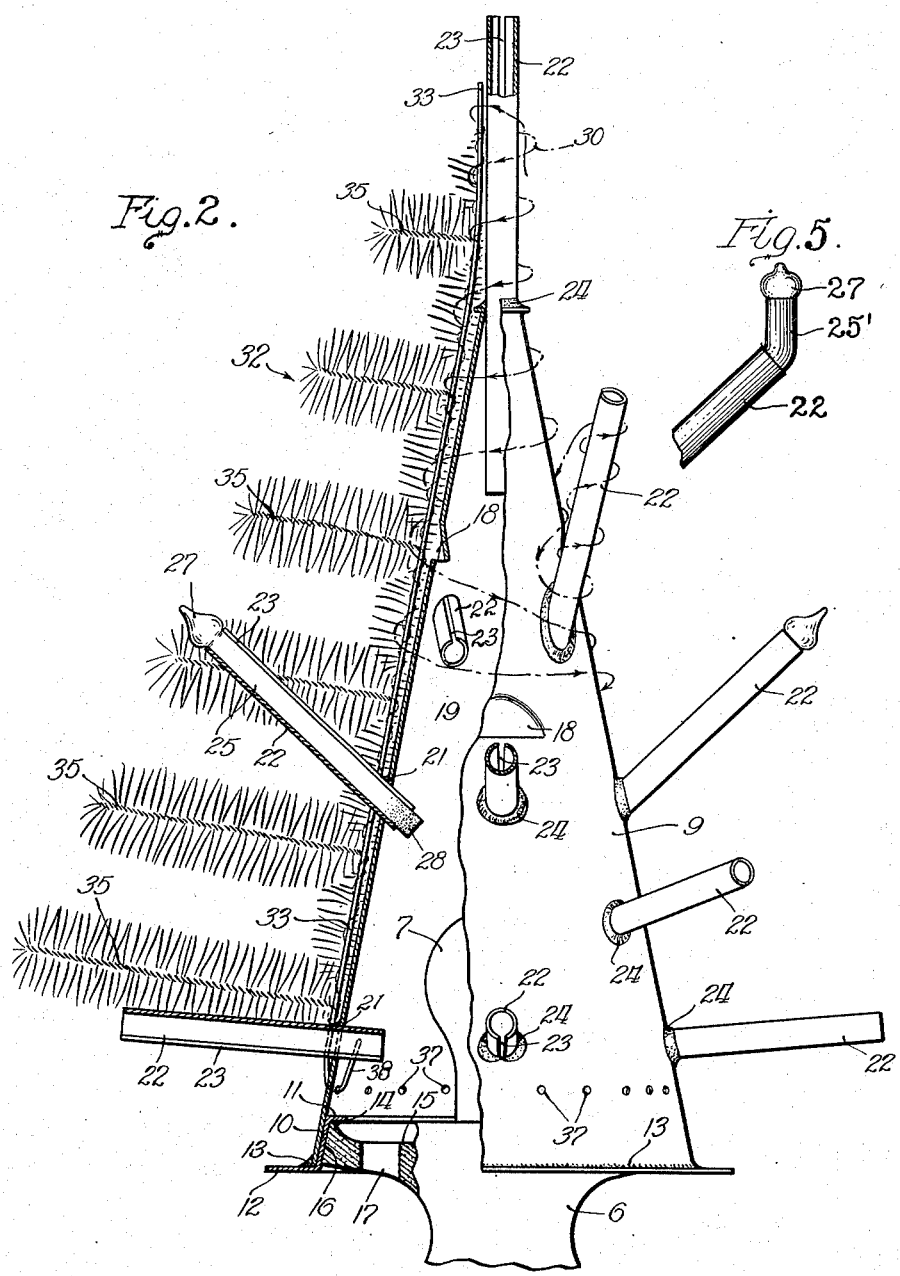

Patented Aug. 9, 1938

2,125,907

UNITED STATES PATENT OFFICE 2,125,907

ARTIFICIAL CHRISTMAS TREE AND METHOD OF PRODUCING SAME

John Frei, Jr., Chicago, Ill., assignor to The Glo-lite Corporation, Chicago, Ill., a corporation of Illinois Application April 8, 1936, Serial No. 73,207

9 Claims. (Cl. 240—10)

My invention relates to Christmas trees.

Broadly, the present invention may be characterized as an improvement over the Illuminated artificial plant shown in my Patent No. 1,921,614, granted August 8, 1933.

More specifically, the invention consists in certain novel combinations and arrangements of parts as will hereinafter be more fully set forth and claimed.

In describing this invention, reference is had to the accompanying drawings wherein I have illustrated the preferred embodiment of my invention, and in which:

Figure 1 is an elevational view of a Christmas tree embodying the principles of the present invention;

Figure 2 is a fragmentary view, partly in vertical section and partly in elevation, of the device of Figure 1;

Figures 3 and 4 are detail views of a novel manner of forming foliage for the tree, and Figure 5 is a fragmentary elevational view of a hereinafter described supporting and reinforcing member embracing a modified form of light transmitting member.

Referring now to the drawings, the Christmas tree of the present invention comprises a base 6 which, except as hereinafter provided, may be of any suitable or preferred form. In the form shown, the base is of circular configuration, and it is preferably formed from substantially opaque and non-heat conducting material, such as porcelain or quick-setting plaster, although it may be formed of any other suitable or preferred material. This base is adapted to support a suitable source of light such, for example, as the electric lamp 7, the lamp being received in a suitable socket (not shown) formed in the base. The lamp projects above the base, and it is supplied with current through the medium of an electric cord 8.

In addition to supporting lamp 7, base 6 also supports a suitable light confining hood 9. This hood in the broader aspects of the invention, may be of any suitable or preferred form. However, as the physical embodiment of the instant invention is shown as a Christmas tree, the hood is, therefore, cone-shaped. Preferably, the hood is formed from a suitable metal. At its lower open end, the hood is adapted to receive an annular member or ring 10, which has a friction fit with the inner surface of the hood. Ring 10 is provided, at the upper edge thereof, with an inwardly directed annular flange 11, while the lower edge of the ring has an outwardly extending annular flange 12, formed integrally therewith. Hood 9 seats on flange 12 and is secured thereto as by soldering or welding, as indicated at 13. Flange 11 seats on an upwardly projecting shoulder 14, formed adjacent the outer periphery of supporting portion 15 of base 6, and thereby supports the hood upon the base. Preferably, sides 16 of base 6 are inclined upwardly and inwardly to conform with the cone-shaped form of ring 10 and hood 9. Vent openings 17 formed in base 6, and vent openings 18 formed in hood 9, permit free circulation of air through chamber 19, formed by the hood and base, to thereby dissipate the heat from the light source.

Hood 9 is also provided with a plurality of bores 21 for the reception of a plurality of supporting and reinforcing members in the form of tubes 22, each of which have their free longitudinal edges slightly spaced apart to thereby provide a tube having a longitudinally extending slot 23. Preferably, these tubes are formed of metal, and they are secured to the hood as by soldering or welding, as indicated at 24. As shown, one end of each of the tubes extends through its respective bore and projects into the chamber 19 for a relatively short distance only. Externally of the hood, the tubes project outwardly therefrom for an appreciable distance, and are preferably disposed in angular relation thereto, depending upon their position upon the hood. The tubes are each adapted to receive and support a light transmitting element in the form of a glass rod 25. After the rod is inserted into the tube, the tube is then crimped about the rod to firmly secure it therein. The provision of slot 23 in the tubes permits of such crimping operation.

Rods 25 are slightly greater in length than tubes 22 and, at their outer ends, are provided with a pear-shaped object 27. This object may, of course, be of any other suitable or preferred form. Such object preferably abuts the outer end of the tube, as best shown in Fig. 2, although, if desired, the outer end of the rod could be bent upwardly to provide a portion 25' between the object and the outer end of the tube, in which case the tube would abut the bend in the rod, as shown in Figure 5. At its inner end the rod projects from the inner end of the tube for a relatively short distance into chamber 19, being thereby placed in light conducting communication with light source 7. Preferably, certain of the rods have that portion thereof that projects into chamber 19, colored as indicated at 28, in the manner and for the purpose set out in connection with my co-pending application, Serial No. 55,174, filed December 19, 1935, for Colored ornamental light and method. When lamp 7 is illuminated, light rays emanating therefrom will pass through the rods and illuminate the objects 27.

In addition to their foregoing functions, hood 9 also constitutes the body of the tree, while tubes 22 constitute the branches thereof. As shown diagrammatically at 30, both the hood and tubes are wound with a material known commercially as "Visca", in the manner and for the purpose set out in my co-pending application, Serial No. 73,206, filed April 8, 1936. This material constitutes the foliage of the tree. The tree is also provided with additional foliage, designated generally at 32, which is formed in the novel manner shown in Figures 3 and 4.

Referring now to Figures 3 and 4, the foliage 32 is formed by disposing a pair of relatively stiff wires 33 in parallel spaced relationship, and firmly securing the outer ends thereof in a pair of spaced heads A and A'. Material 30 is then wound around each of these wires, for the full length thereof between the heads, as indicated at 34. The wires are then connected together by a plurality of transversely disposed strips 35 of material 30, these strips being disposed between the wires 33 and having their ends wrapped thereabout, as indicated at 36. Strips 35 are then cut diagonally from head A to head A' in the manner indicated by the line B—B. Such cutting operation produces a pair of stems 33 from each of which project a plurality of branches 35, the branches shortening in length from one end of wire 33 to its opposite end, as shown in Figure 4. To mount the foliage 32 upon the hood, the end of wire 33, adjacent the longest of the branches 35, is bent upwardly to form a right angle with the wire, such bent portion 38 of the wire extending outwardly therefrom in a direction opposite to the direction of extension of branches 35. Bent portion 38 is passed through an opening 37, a plurality of which are formed in the hood adjacent the lower edge thereof, and then bent upwardly with respect to the hood, to thereby secure the lower end of the wire thereto. From such opening, the wire abuts the hood for the full length thereof, and it is bound to the hood by the material 30 which is wrapped thereover.

While the rods 25 are conveniently formed of glass, any other suitable material for the purpose and capable of producing the desired results, may be employed. It will be understood, therefore, that the term "glass", as used herein, is to be construed as meaning either glass proper, or any other material equivalent to glass within the teaching of my invention as defined by the appended claims.

Further, although a preferred embodiment of my invention has been illustrated and described, by way of example, it will be obvious that changes may be made therein within the spirit and scope of the invention and, therefore, I do not limit my invention to the form herein disclosed, except in so far as it may be so limited in the appended claims.

What I claim is:

1. A Christmas tree of the class described comprising in combination with a base, a cone-shaped hood mounted upon said base and defining a chamber therewith, there being a plurality of openings in said hood, a light source disposed in said chamber, elongated supporting members carried by said hood adjacent said openings and extending outwardly therefrom, and light transmitting elements carried by said supporting members and communicating with said openings, said hood constituting the body of said tree and the supporting members the branches thereof, of means wrapped about said hood and said supporting members and simulating the foliage of said tree, a plurality of members carried by and extending substantially parallel to the sloping sides of said hood, and foliage means carried by said members and providing foliage for said tree separate and apart from said last named foliage means.

2. A Christmas tree of the class described comprising in combination with a base, a hood mounted upon said base and defining a chamber therewith, there being a plurality of openings in said hood, a light source disposed in said chamber, elongated supporting members carried by said hood adjacent said openings and extending outwardly therefrom, and light transmitting elements carried by said supporting members and communicating with said openings, said hood constituting the body of said tree and the supporting members the branches thereof, of means wrapped about said hood and said supporting members and simulating the foliage of said tree, a plurality of wires carried by said hood, and foliage material carried by said wires and providing foliage for said tree which is in addition to said last named foliage means.

3. A Christmas tree of the class described comprising in combination with a base, a hood mounted upon said base and defining a chamber therewith, there being a plurality of openings in said hood, a light source disposed in said chamber, elongated supporting members carried by said hood adjacent said openings and extending outwardly therefrom, and light transmitting elements carried by said supporting members and communicating with said openings, said hood ocnstituting the body of said tree and the supporting members the branches thereof, of means wrapped about said hood and said supporting members and simulating the foliage of said tree, a plurality of wires associated with said hood, means positively connecting one end of said wires to said hood, and foliage material carried by said wires and providing foliage for said tree which is in addition to said last named foliage.

4. A Christmas tree of the class described comprising in combination with a base, a hood mounted up on said base and defining a chamber therewith, there being a plurality of openings in said hood, and said hood having a plurality of apertures formed therein, a light source disposed in said chamber, elongated supporting members carried by said hood adjacent said openings and extending outwardly therefrom, and light transmitting elements carried by said supporting members and communicating with said openings, said hood constituting the body of said tree and the supporting members the branches thereof, of means wrapped about said hood and said supporting members and simulating the foliage of said tree, a plurality of wires associated with said hood, means carried by one end of said wires engaging in the apertures in said hood and securing said wires thereto, and foliage material carried by said wires and providing foliage for said tree which is in addition to said last named foliage means.

5. A Christmas tree of the class described comprising in combination with a base, a cone-shaped hood mounted upon said base and defining a chamber therewith, there being a plurality of openings in said hood, and said hood having a plurality of apertures formed therein adjacent the lower end thereof, a light source disposed in said chamber, elongated supporting members carried by said hood adjacent said openings and extending outwardly therefrom, and light transmitting elements carried by said supporting members and communicating with said openings, said hood constituting the body of said tree and the supporting members the branches thereof, of means wrapped about said hood and supporting members and simulating the foliage of said tree, a plurality of wires associated with said hood, a hook formed on the lower ends of each of said wires and engaging in the apertures in said hood to thereby secure the lower ends of said wires to said hood, said wires abutting said hood for the full length thereof and said foliage means being wrapped thereabout to bind said wires to said hood, and foliage material carried by said wires and providing foliage for said tree which is in addition to said last named foliage means.

6. An illuminated artificial tree comprising in combination with a hollow form in substantially the desired shape of the tree, there being a plurality of openings in said form, a light source supported within said form, and a plurality of elongated light transmitting elements carried by said form adjacent said openings and extending outwardly therefrom and disposed in light conducting communication with said openings, of means wrapped about said form and simulating the foliage of said tree, a plurality of substantially axially extending members positioned about and carried by said form, and foliage means comprising a plurality of members carried by and extending radially outwardly from each of said first named members and providing foliage separate and apart from said first named foliage means.

7. An illuminated artificial Chritsmass tree comprising in combination a hollow form in substantially the desired shape of the tree and constituting the body of the tree there being a plurality of openings in said form, a light source supported within said form, a plurality of light transmitting elements associated with said form, each of said elements having one end disposed in light conducting relationship with an opening and having an object to be illuminated at the opposite end thereof, slotted tubes crimped about said light transmitting elements and having one end abutting said object and the opposite end projecting into said form, said tubes supporting said light transmitting elements upon said form and confining therein the rays of light passing therethrough to said object, and means securing said tubes to said form.

8. An illuminated artificial Christmas tree comprising in combination a hollow form in substantially the desired shape of the tree and constituting the body of the tree there being a plurality of openings in said form, a light source supported within said form, a plurality of light transmitting elements associated with said form, each of said elements having one end disposed in light conducting relationship with an opening and having an object to be illuminated at the opposite end thereof, slotted tubes crimped about said light transmitting elements and having one end abutting said object and the opposite end projecting into said form, said tubes supporting said light transmitting elements upon said form and confining therein the rays of light passing therethrough to said object, and an adhesive embracing said tubes and abutting said form to secure said tubes thereto.

9. A Christmas tree of the class described comprising a hood constituting the body of the tree, supporting members secured to said hood and forming the branches of the tree, light transmitting members carried by said supporting members and communicating with the interior of said hood, a plurality of wires mounted on said hood and carrying material providing foliage for the tree, and a securing wire wrapped substantially spirally about said hood overlying said plurality of wires and carrying additional foliage material for the tree, said securing wire being also wrapped about said supporting members and held thereby against unwrapping.

JOHN FREI, Jr.